(12) United States Patent
Kynast et al.

(10) Patent No.: US 6,594,282 B1
(45) Date of Patent: Jul. 15, 2003

(54) METHOD FOR LINKING DIGITAL DESCRIPTIONS OF TRAFFIC ROUTE NETWORKS AND LOCATION DATABASE

(75) Inventors: Andreas Kynast, Hildesheim (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/384,962

(22) Filed: Aug. 27, 1999

(30) Foreign Application Priority Data

Aug. 29, 1998 (DE) .......................................... 198 39 413

(51) Int. Cl.⁷ .................................................. H04J 1/02
(52) U.S. Cl. ........................ 370/493; 370/529; 340/905; 455/456; 701/208; 707/104.1
(58) Field of Search ................................. 370/277, 254, 370/310, 252, 465, 493, 389, 401, 529; 701/23, 25, 26, 301, 117, 201, 207, 200.1, 208; 707/1, 7, 102, 104.1; 455/456, 414; 379/59; 340/905; 364/449.1; 348/473

(56) References Cited

U.S. PATENT DOCUMENTS 5,922,040 A * 7/1999 Prabhakaran ................ 701/117
6,133,853 A * 10/2000 Obradovich et al. ........ 340/905

FOREIGN PATENT DOCUMENTS

| DE | 196 06 010 A1 | 2/1996 | |
| DE | 19606010 | * 8/1997 | ........... G06F/19/00 |
| EP | 0 263 253 | 4/1988 | |
| EP | 0 756 260 | 1/1997 | |

* cited by examiner

*Primary Examiner*—John Pezzlo
(74) *Attorney, Agent, or Firm*—Kenyon & Kenyon

(57) ABSTRACT

In a method for linking a digital description of a traffic route network to at least one additional digital description of a traffic route network and a location database with a link to at least one additional location database, it is provided that records of the locations which have at least one adjacent location in at least one of the additional descriptions of traffic route networks and/or location databases have at least one reference to at least one such adjoining location.

10 Claims, 2 Drawing Sheets

| L | O | OC | OC- | | OC+ | |
|---|---|---|---|---|---|---|
| 4 bit | 6 bit | 16 bit | 16 bit | 16 bit | 16 bit | 16 bit |
| 2 | 3 | B | 111111 0010 000100 | A | C | - |
| 2 | 3 | C | B | - | 111111 0001 000011 | D |
| 2 | 4 | A | 111111 1111 111111 | - | 111111 0010 000011 | B |
| 1 | 3 | D | 111111 0010 000011 | C | ... | - |

| L | O | OC | OC- | OC+ | Q |
|---|---|---|---|---|---|
| 4 bit | 6 bit | 16 bit | 16 bit | 16 bit | 16 bit |
| 2 | 3 | B | 111111 0010 000100 | C | A |
| 2 | 3 | C | B | 111111 0001 000011 | D |
| 2 | 4 | A | 111111 1111 111111 | 111111 0010 000011 | B |
| 1 | 3 | D | 111111 0010 000011 | ... | C |

| L | O | OC | OC- | OC+ | Q | | |
|---|---|---|---|---|---|---|---|
| | | | | | L | O | OC |
| 4 bit | 6 bit | 16 bit | 16 bit | 16 bit | 4 bit | 6 bit | 16 bit |
| 2 | 3 | B | 111111 1111 111111 | C | 0010 (2) | 000100 (4) | A |
| 2 | 3 | C | B | 111111 1111 111111 | 1 | 3 | D |
| 2 | 4 | A | 111111 1111 111111 | 111111 1111 111111 | 2 | 3 | B |
| 1 | 3 | D | 111111 1111 111111 | ... | 2 | 3 | C |

Fig.4

| L | O | OC | OC- | OC+ |
|---|---|---|---|---|
| 4 bit | 6 bit | 16 bit | 16 bit | 16 bit |
| 2 | 3 | B | 111111 1111 111111 | C |
| 2 | 3 | C | B | 111111 1111 111111 |
| 2 | 4 | A | 111111 1111 111111 | 111111 1111 111111 |
| 1 | 3 | D | 111111 1111 111111 | ... |

Fig.5

METHOD FOR LINKING DIGITAL DESCRIPTIONS OF TRAFFIC ROUTE NETWORKS AND LOCATION DATABASE

FIELD OF THE INVENTION

The present invention relates a method for linking a digital description of a traffic route network to at least one additional digital description of a traffic route network and a location database with a link to at least one additional location database, in particular for determining routes between traffic route network locations contained in the location database and in the at least one additional location database, in which a location database provided for decoding digitally coded traffic messages contains the necessary locations for the decoding of digitally coded traffic messages as location codes with a traffic route and references to adjacent locations situated on the same traffic route being assigned to each location code in one record.

BACKGROUND INFORMATION

The radio data system (RDS) makes possible an additional, inaudible transmission of data simultaneously with radio programs in one data channel. Specifications of the radio data system for ultrashort wave radio are established among other places in publication Tech. 3244-E, March 1984, of the European Broadcasting Union (EBU). Radio receivers with suitable RDS decoders can receive and decode transmitted data in addition to the radio reception with the same receiving component. Thirty-two groups, each with 104 bits, are provided for transmission, with each of the transmitted groups being assigned a specific service. Group 8a is currently provided for the transmission of digitally coded traffic messages. Such traffic messages fundamentally can also be transmitted via other transmission systems, such as DAB (Digital Audio Broadcasting) and mobile radio systems.

The structure and coding of these traffic messages are established in CEN Draft pr. ENV/278/4/1/0011 which was based on the standards recommendation ALERT C, published by the RDS ATT ALERT Consortium, November 1990. The essential elements of such a traffic message are the location of the event (Location) and the event (Event). The data are cataloged, that is, a unique code is assigned to each traffic-relevant location and to each traffic-relevant event. The linking of the locations in the location table along existing roads represents the course. Required for use of the traffic reporting channel, in addition to the conventional receiving device with an RDS decoder, are TMC (traffic message channel) devices for decoding, storing, further processing, and outputting of traffic messages.

The location databanks required for the decoding of traffic messages are made up of lists of junctions, interchanges, expressway merge points, exits to parking places, and similar locations with all locations situated on a road (expressway, highway) being linked together by references. Since not all locations are accessible from both directions, the linkages are given for both directions separately through a predecessor and a successor for each location being entered in the location database. If a location does not have a successor, for example, at the end of a road, this fact is designated by a special entry. Locations, such as intersections, for example, which are situated on multiple routes, are entered for each of these routes with different location codes.

This location database structure, in which thus no relationships are indicated between the same locations on different routes, is sufficient for the decoding of the traffic messages. For outputting the decoded traffic messages, this does indeed provide, for a particular location, a particular name which is indicated in coded form upon every occurrence of the same place in the location database. This information however only serves for outputting the actual name as an alphanumeric display or as voice output.

One advantage of the digitally coded traffic messages is that they do not exist as voice samples but rather as data which can be processed in multiple ways. In this way, for example, a selection of traffic messages is possible so that the automobile driver obtains only those traffic messages which relate to his prospective route and detours which may come into consideration.

It is nevertheless a prerequisite for a selection of this kind that the prospective route be known to the computer which is to perform this selection. This can take place through a manual inputting of the prospective route. Another possibility is for the destination to be input and for the computer to be allowed to determine the route.

Suitable calculating procedures are known and are available, for example, in PC programs. For this purpose, however, a road map is needed which contains the relevant roads and intersections and the distances between the intersections and other locations.

The use of this kind of a location database of route search is possible according to German Patent Application No. 196 06 010 in that there are cross references to those locations which are situated on two routes and thus represent intersections. With this, however, a route search between locations which are listed in different location databases is still not possible. This may occur, for example, in the case of route searches which span national borders since the compilation of location databases generally takes place by country. However, this problem can even occur within one country if, for example, regional location databases supplement a country-wide database since the latter represents the network of roads in the urban areas only inadequately or different traffic route networks (automobile, train, etc.) are described by the databases.

SUMMARY OF THE INVENTION

An object of the present invention therefore is to provide a method for linking digital descriptions of traffic route networks and a suitable location database for linking with at least one additional location database, in particular for the determination of routes between locations contained in the location database and at least one additional location database.

This object is achieved in the method according to the present invention in that records of those locations, which have at least one adjacent location in at least one of the additional descriptions of traffic route networks, have at least one reference to at least one such adjacent location.

The location database according to the present invention provides that the records of those locations, which have at least one adjacent location in at least one of the additional location databases, contain at least one reference to at least one such adjacent location including a location database reference. It is preferably provided that the location database reference is composed of a country number and a location database number.

The present invention makes possible a search for routes spanning location databases, for example within the European traffic route network, without fundamentally changing the structure of the location database as it is necessary for decoding traffic messages. The route search as such is not an object of the present invention. Various methods are known for performing such searches. It is merely necessary that information in the location databank concerning the geographic situation of the locations be present, for example their geographic coordinates. The application of the present invention is not limited to a search for routes. Thus, for example, coding and decoding of messages which span location databases can be undertaken using the present invention.

To be able to distinguish a location contained as a reference in the location database from other information, one advantageous embodiment of the location database according to the present invention provides that the location database reference be designated as such by a reserved code word. This can be composed, for example, of six leading 1's.

A first embodiment of the database according to the present invention, in which each record, in addition to a data field for that location and other data fields, has one data field each for the designation of adjacent locations, is composed of the data fields for designating the adjacent locations, each being designed for receiving the reserved code word, the location database reference, and the location code of an adjacent location situated in one of the additional location databases.

In this embodiment, two locations from a different location database can be referenced in a record of a location with the direction being taken into consideration. The expansion is made only at these transition points, all other location databases remaining unchanged.

A second embodiment of the location database according to the present invention, in which each record, in addition to a data field for the particular location and other data fields, contains a data field for the designation of each adjacent location, is composed of the data fields for the designation of adjacent locations, each being designed for receiving the reserved code word and the location database reference and, in the event of the presence of an adjacent location situated in one of the other location databanks, an additional data field containing its location code.

In this embodiment, in place of the end code (the particular location is situated at the end of one of the roads included in the particular location database), the location database reference is inserted. Since only the ends of stretches of routes are considered here, the addition of the location code at the end of a record is sufficient. This embodiment has the advantage that it corresponds to the structures suggested in German Patent Application No. 196 06 010. Complex intersection situations can be described using known location database elements.

In a third embodiment of the location database according to the invention in which each record, in addition to a field for the particular location and other data fields, contains a field for the designation of adjacent locations, it is provided that the data fields for the designation of adjacent locations be filled corresponding to the part of the network of routes represented by the location database and that the location database reference and the location code of an adjacent location situated in one of the additional location databases be filed in a data field for cross references.

In this embodiment, the entries provided for decoding the traffic messages, in particular also the end code, remain unchanged. The cross reference is implemented in each case through appending data fields to the records affected. The embodiment has the advantage that it does not change the original location database. In this embodiment, even complex intersection situations can be described. It can be provided in the first through the third embodiments that the data fields for designating adjacent locations have variable lengths.

BRIEF DESCRIPTION OF THE DRAWINGS

FIG. 4 shows, in tabular form, excerpts from various examples of location databases.

FIG. 5 shows excerpts from location databases which are non-networked according to the location databases known in the past.

DETAILED DESCRIPTION

Figures 1, 2, 3:
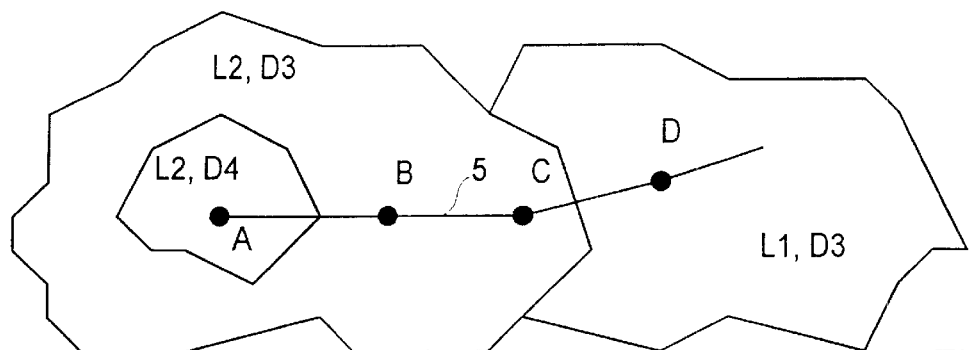
FIG. 1 shows several locations connected by a road which are listed in different location databases.
FIG. 2 shows, in tabular form, excerpts from various examples of location databases.
FIG. 3 shows, in tabular form, excerpts from various examples of location databases.

In the schematic representation in FIG. 1, a road 5 is represented on which four locations A, B, C, D are situated. Of these, the locations A, B, C are situated in country L2, while location D is situated in country L1, for which a location database D3 exists.

Locations B and C are included in a location database D3, while within country L2, a database D4 was compiled for a delimited region. Naturally the databases contain significantly more locations which for the sake of clarity are not represented in FIG. 1. In countries L1 and L2, there are databases D3 which however only coincidentally have the same database number 3 since they relate to the particular countries and can be distinguished using the country number (1 or 2).

In FIGS. 2 through 5, the entries in the particular location databases are represented to the extent they are required for elucidating the location database according to the present invention. In each, one line relates to one location and contains a four-bit data field for the country number L, a 6-bit data field for the location database number O, and the location code OC for the particular location, for which 16 bits are used. For each location, a predecessor OC− and a successor OC+ are also given. In addition, FIGS. 2 through 5 each show excerpts from location databases D3 and D4 of country L2 and of location database D3 of country L1.

In the exemplary embodiment according to FIG. 2, the data fields for predecessor OC− and OC+ are each 32 bits wide, with 16 bits being used for a cross reference to another location database and 16 additional bits being used for the location code of the adjacent location. Thus, for example, in the line for location B, a cross reference is entered under predecessor OC− with the contents 111111 0010 000100. The first six digits mean that this is a cross reference to a different location database. Next comes the country number with 0010 (in the depicted example 2) and the location database number with 000100 (4 in the depicted example). In the thus specified location database (see two lines below) location A is found, which does not have a predecessor OC−, this being represented by the end code 111111 1111 111111. For location B in location database D3 of country L2, a successor C is also indicated which is listed in the same database and therefore does not require a cross reference. Alternatively, it is possible to provide only 32-bit data fields even if a cross reference is present. Otherwise only 16 bits are provided.

In the next line below, which pertains to location C, location B is entered as a predecessor and location D as a successor with a cross reference which refers to country number 1 and database number 3. Starting out from location D, for example, the route search can then be continued in database D3 in country L1.

In the example depicted in FIG. 3, 16-bit data fields are provided for both predecessor OC− and successor OC+. In the case of cross references, as in the case of location B, the particular data field not used by a location from the same database can be used for the predecessor/successor in the form of the reserved code word, country number, and location database number, while an additional database Q provided for a cross reference contains the location code of the location from the other location database. In the case of location B, location A thus appears as predecessor, while in the case of location C, location D is entered as successor.

In the exemplary embodiment according to FIG. 4, data fields for predecessor OC− and successor OC+ are also provided. The data on the locations in other location databases are listed exclusively as cross references. They are made up of country number L, location database number O and location code OC of the location in the other database. This configuration has the advantage that a location database according to German Patent Application No. 196 06 010, which is suitable for a route search within the territory of this location database, can also be used without structural modifications for a route search which spans location databases.

For further clarification of the present invention, the same excerpts from the location databases already represented in FIG. 2 through FIG. 4 are shown again in FIG. 5, but without changes according to the present invention, i.e. location B in country L2 does not have any predecessor and location C does not have a successor in location database D3 in country L1. Location A in location database D4 has neither predecessor nor successor and location D in location database D3 in country L1 does not have a predecessor. A successor to location D is merely suggested.

What is claimed is:

1. A location database, having a link to at least one additional location database, for determining routes between locations of a traffic route network that are contained in the location database and in the at least one additional location database, comprising:

means for decoding digitally coded traffic messages, containing locations, necessary for the decoding of the digitally coded traffic messages, as location codes;

means for assigning, in a record to each of the location codes, one traffic route and references to adjacent locations on the one traffic route; and means for providing at least one reference in records of locations having at least one adjacent location in the at least one additional location database, the at least one reference being provided to the at least one adjacent location and including a location database reference.

2. The location database according to claim 1, wherein the location database reference includes a country number and a location database number.

3. The location database according to claim 1, wherein the location database reference is associated with a reserved code word.

4. The location database according to claim 1, wherein each record includes a plurality of data fields, the data fields including a first data field for a particular location and at least one second data field for designating adjacent locations, each of the at least one second data field receiving a reserved code word, the location database reference and a location code of the at least one adjacent location situated in the at least one additional location database.

5. The location database according to claim 1, wherein each record includes a plurality of data fields, the data fields including a first data field for a particular location and at least one second data field for designating adjacent locations, each of the at least one second data field receiving a reserved code word and the location database reference, the data fields further including a third data field containing a location code.

6. The location database according to claim 1, wherein each record includes a plurality of data fields, the data fields including a first data field for a particular location and at least one second data field for designating adjacent locations, the at least one second data field being filled according to a portion of a route network represented in the location database, the data fields further including a third data field, the location database reference and a location code of the at least one adjacent location situated in the at least one additional location database being filed in the third data field for cross references.

7. The location database according to claim 4, wherein the at least one second data field includes a plurality of second data fields having variable lengths.

8. The location database according to claim 5, wherein the at least one second data field includes a plurality of second data fields having variable lengths.

9. The location database according to claim 6, wherein the at least one second data field includes a plurality of second data fields having variable lengths.

10. The location database according to claim 1, wherein the location database is used for coding and decoding messages spanning a plurality of location databases.

* * * * *